United States Patent [19]

Bodlaj

[11] 4,111,552
[45] Sep. 5, 1978

[54] APPARATUS AND METHOD FOR MEASURING DISTANCE FROM AND SPEED COMPONENTS OF AN OBJECT TRAVELING VERTICAL TO A REFERENCE LINE

[75] Inventor: Viktor Bodlaj, Munich, of Germany

[73] Assignee: Siemens Aktiengesellschaft, Berlin & Munich, Germany

[21] Appl. No.: 731,650

[22] Filed: Oct. 13, 1976

[30] Foreign Application Priority Data

Oct. 17, 1975 [DE] Fed. Rep. of Germany ....... 2546714

[51] Int. Cl.² .................. G01C 3/00; G01C 3/08; G01P 3/36
[52] U.S. Cl. .................................. 356/4; 328/130; 356/1; 356/28
[58] Field of Search ............ 356/1, 28, 4, 5, 141, 356/152; 307/234; 328/109, 110, 111, 112, 130; 343/13 R

[56] References Cited

U.S. PATENT DOCUMENTS

| 3,692,414 | 9/1972 | Hosterman et al. | 356/4 |
| 3,830,567 | 8/1974 | Riegl | 356/5 |
| 3,900,261 | 8/1975 | Wingate | 356/4 |

Primary Examiner—S. C. Buczinski
Attorney, Agent, or Firm—Hill, Gross, Simpson, Van Santen, Steadman, Chiara & Simpson

[57] ABSTRACT

A method and apparatus for the rapid measurement of the distance of an object from a reference point and the speed component of an object traveling vertical to a reference plane is disclosed. A laser beam from a transmitter is periodically sent by a beam deflector through the space in which the object is situated. The laser beam is diffusely reflected from the object and is registered as a measurement pulse on a detector placed near the transmitter. The distance of the object is determined from the time difference between one starting point of a deflected beam segment selected for the measurement and the detector signal. A reference pulse is created in an additional reference detector at a reference time by positioning a swing mirror so that a portion of the laser beam is reflected on a transparent body situated on the reference plane, the reflection then impinging upon the reference detector. The time difference is measured from the reference time to the middle of the measurement pulse.

12 Claims, 4 Drawing Figures

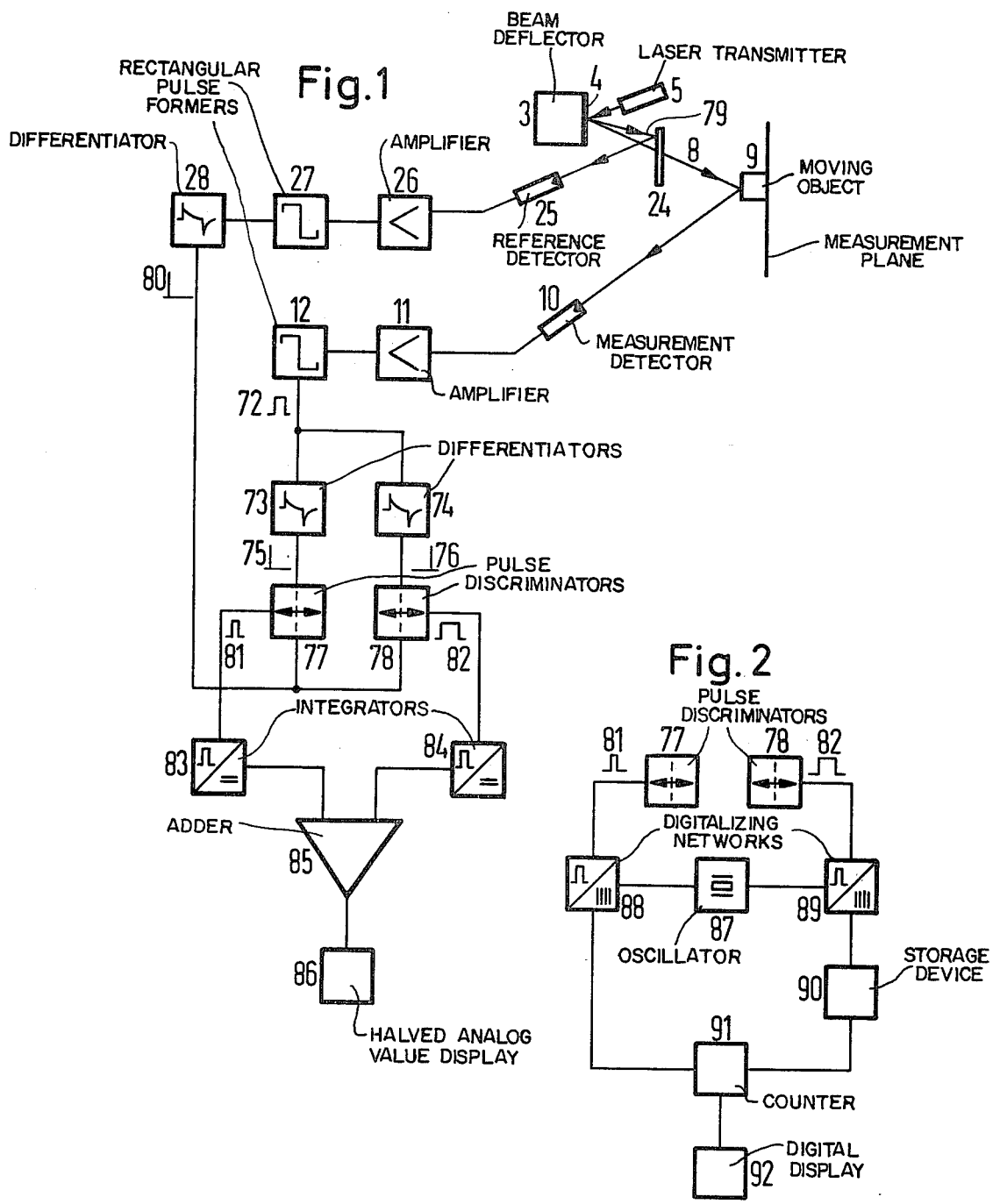

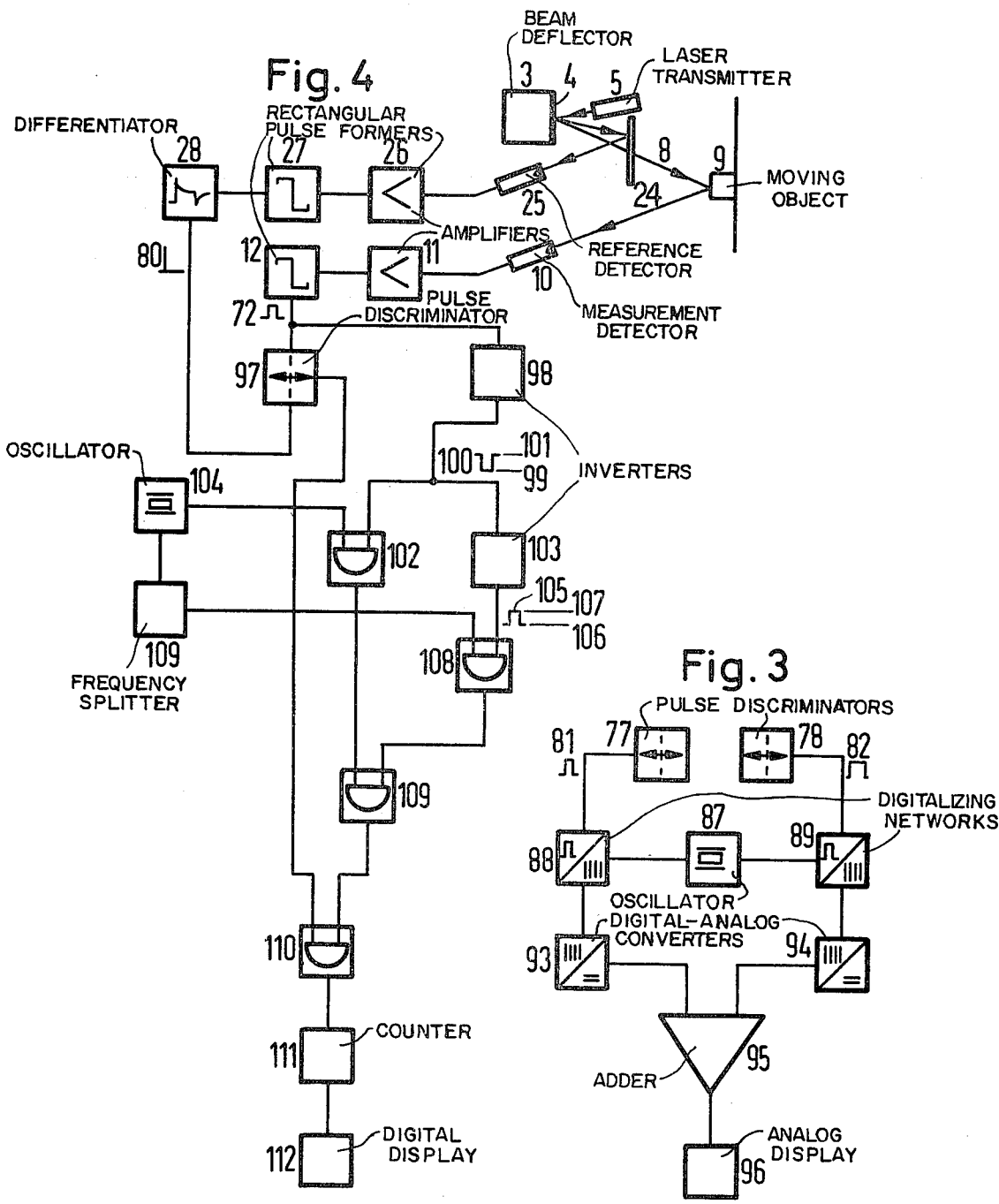

APPARATUS AND METHOD FOR MEASURING DISTANCE FROM AND SPEED COMPONENTS OF AN OBJECT TRAVELING VERTICAL TO A REFERENCE LINE

BACKGROUND OF THE INVENTION

1. Field of the Invention

The invention concerns a process for the rapid measurement of the distance of an object from a point of reference and the speed components of an object vertical to the reference plane.

2. Description of the Prior Art

In this process, laser beams are periodically sent from a transmitter via a beam deflector through the space in which the object is located. The beams are reflected diffusely by the object and are registered on a detector situated near the transmitter. This detector can only receive light from a given direction, and the distances are determined from the time difference $\Delta t_d$ between one selected start of the beam deflector and the detector signal. Reference pulses are initiated at points of time $t_{ref}$ in a separate reference detector in which s swinging mirror is situated such that the laser beams are reflected from a transparent plate situated on the reference plane onto the reference detector.

RELATED SUBJECT MATTER

In my U.S. Pat. No. 3,923,395, issued on Dec. 2, 1975, and claiming priority based upon German application No. 2,325,086 filed May 17, 1973, it is proposed to activate the beam deflector by a generator with a sinusoidal voltage at a frequency matching the individual resonances of the mechanical construction of portions of the system.

In this way only the approximately linear part of the sinusoidal voltage is involved in the measurement.

A high degree of accuracy is achieved by this method. Through the introduction of an extra reference detector and of a semitransparent mirror disc defining the reference level, the reference time $t_{ref}$ can be determined very exactly since these two parts of the structure are coordinated and finely tuned one against the other and against the amplitude of the light rays falling on them from the light source.

However, errors can arise in the determination of the moment of measurement, i.e., that moment when the ray reflected from the measured object is registered by the detector. Since this ray is received by the detector for a short time, either the rising edge of the measurement pulse released by the detector or the falling edge of the differentiated measurement pulse is chosen as the moment of measurement. The first of these moments of measurement depends very much on the amplitude of measurement. For exact determinations of time, the carrying out of this process requires a stabilized detector pulse amplitude, which, however, can only be achieved during the time taken for several reflections. The use of a single reflection for independent measurement is thus not possible.

In the other method, in which the falling edge of the differentiated measurement pulse is taken as the gauge of time, the amplitude of the detector pulse has less influence on the creation of error of the measurement moment, but the influence of the shape of the detector pulse increases. This pulse shape is influenced by the sharpness of depth, which differs from distance to distance with constant focusing of the picture display glass in front of the detector, and by the shape of the light scattering at the surface of the object being measured.

SUMMARY OF THE INVENTION

An object of the invention is to eliminate the above-mentioned sources of error.

According to the invention it is therefore proposed to measure the time difference $\Delta t_d$ from time $t_{ref}$ exactly to the center of the measurement pulse.

The measurement pulse of duration $t_D$ is converted to a rectangular pulse. The length $\Delta t_W$ of the rectangular pulse depends on the adjustment of the initiation threshold of a reinforcing voltage comparator and on the amplitude of measurement. Because of the very strong boost from the comparator, the length of the pulse changes almost symmetrically around the center of the rectangular pulse when the pulse amplitude changes. If the times from reference moment $t_B$ to the rising edge and from the reference moment $t_B$ to the falling edge of the rectangular pulse are summed for different pulse lengths $\Delta t_W$, the sum of both times remains constant even with varied pulse lengths $\Delta t_W$.

Thus the total time remains independent of the measurement pulse amplitude.

The drawings show several embodiments for the measurement and display of the time difference $\Delta t_d$ from the time $t_{ref}$ to the middle of the measurement pulse.

BRIEF DESCRIPTION OF THE DRAWINGS

FIG. 1 is a block diagram illustrating the rapid measurement system of this invention having an analog display;

FIG. 2 is a block diagram of an alternate embodiment of the system of FIG. 1 in which a digital display is utilized; and FIGS. 3 and 4 illustrate an alternate embodiment of the rapid measurement system of this invention in which digital display is utilized in FIG. 3 and analog display in FIG. 4.

DESCRIPTION OF THE PREFERRED EMBODIMENTS

An example of a process for the measurement of distance is described in FIG. 1. A swing mirror is mounted on a beam deflector 3 so that it can be turned in such a way that a laser beam transmitted from a laser transmitter 5 is reflected on the swing mirror 4 and then searches out a measurement plane in which the object 9 is situated. At a given position of the swing mirror 4 there arises a reflection direction 8 of the laser beam which hits the object 9. From here the beam is propagated to a measurement detector 10. This propagated light passes for a short time over the light-sensitive surface of the detector 10, during which time a measurement signal is initiated at the output of detector 10 and which has a length which depends on the length of time the light is in contact with the light-sensitive surface. This signal is boosted in amplifier 11 and transmitted to a pulse former 12 which forms a rectangular voltage 72 from the signal. This is sent in parallel to two differentiators 73 and 74, from which only the rising edge 75 and the falling edge 76 are connected into the input of the pulse discriminators 77 and 78.

A short time before the position of the swing mirror 4 which gives reflection direction 8 is a mirror position which deflects the laser beam in direction 79. The thus reflected laser beam is reflected from a transparent disc 24 which is firmly connected in space with the entire beam transmitter apparatus, and reaches a reference detector 25. The relevant swing mirror position occurs at time $t_{ref}$. The reference signal arising in reference detector 25 is boosted in amplifier 26, and converted into a rectangular pulse in the pulse former 27. The rising edge of the rectangular pulse is differentiated in differentiator 28 and connected in parallel to the time discriminators 77 and 78. Here arise two pulses 81 and 82 with lengths proportional to the time difference between the rising edge 80 and the rising edge 75 and the rising edge 80 and the falling edge 76. The two pulses 81 and 82 are integrated in the integrators 83 and 84, fed to an adder 85 which sums the voltages arising in integrators 83 and 84, and are displayed as halved analog values on a display instrument 86.

After a calibration of the measuring apparatus, the displayed value is equivalent to the distance of the object from the display apparatus.

The accuracy of the display is improved if the lengths of pulses 81 and 82 are taken for several periods of the swing mirror operation and are summed, halved and shown as averages.

The halving is necessary because the total of the times between the mirror position giving reflection direction 79 and that giving reflection direction 8, i.e., $\Delta t_d$, is measured twice.

FIG. 2 shows how a definition of the measurement time $\Delta t_d$ can be obtained independently of the amplitudes of pulses 81 and 82. These two pulses are separately digitalized in two networks 88 and 89 which are controlled by a quartz oscillator 87, are averaged and halved through a storage device 90 and a counter 91, then displayed on a digital display apparatus 92.

Alternatively, as shown in FIG. 3, it is possible to translate the two outputs of the digital values of pulses 81 and 82 emerging from networks 88 and 89 through digital-analog converters 93 and 94 into analog voltages and add them in an adder 95. The output signal is then certainly analog, but the speed of measurement is not affected.

In this type of evaluation, an average of several measurements is readily obtained and thus the accuracy is increased.

In FIG. 4 is shown a switching apparatus with which the measurement time $\Delta t_d$ can be displayed digitally without reducing the speed of measurement.

The pulse 72 and the differentiated needle pulse 80 are produced in the same way as in FIG. 1. The pulse 72 is connected in parallel to a pulse discriminator 97 and an inverter 98. The amplitude 99 of the inverted pulse 100 is reduced to zero potential and the original zero potential 101 is raised to a positive potential. The pulse 100 is now connected in parallel to the input of a NAND gate 102 and to an inverter 103. The second input of the NAND gate is connected to a quartz oscillator 104 which sends out an alternating voltage with frequency $f$. As the positive potential 101 is present at the right-hand input of the NAND gate during the period from $t_{ref}$ to the rising edge of pulse 72, it allows the potential digitalized with frequency $f$ to pass through up to time $t_M$.

The output of the NAND gate 102 is thereafter switched over to zero potential.

In the inverter 103 the pulse 100 is again changed to a pulse 105 such that a value 106 has zero potential and an amplitude 107 has positive potential. Pulse 105 is connected to the right-hand input of another NAND gate 108. The left-hand input of this gate is connected with a frequency splitter 109 which halves the frequency $f$ of the alternating voltage sent out from the quartz oscillator 104.

During the time from $t_{ref}$ to $t_M$ a zero potential exists at the right-hand input of the NAND gate 108. For this reason the alternating voltage with frequency $f/2$, which is connected to the left-hand input of gate 108, cannot pass. The output of gate 108 is, however, switched over to positive potential during this time, a potential which then is present at the right-hand input of another NAND gate 109. The left-hand input is connected with the output of gate 102, from which the positive potential digitalized with frequency $f$ is obtained. Because of the positive potential at the right-hand input of gate 109, the positive potential digitalized with frequency $f$ from gate 109 is allowed to pass through and is led to the right-hand input of gate 110.

The left-hand input of gate 110 is connected with the pulse discriminator 97, which emits a voltage proportional to the time difference between the arrival of the needle pulse 80 at time $t_{ref}$ and the falling edge of pulse 72 at time $t_M$. This voltage is positive and lies at the left-hand input of gate 110. Thus, during the time from $t_{ref}$ to $t_M$, the alternating voltage with frequency $f$ is passed through by gate 110. In the following counting instrument 111 the period number of frequency $f$ is counted for the time $t_1$ between $t_{ref}$ and $t_M$.

During the time $t_2$ between $t_M$ and $t_{M'}$, the gate 102 is closed because at its right-hand input is the zero potential 99 of pulse 100. During this time, however, a positive potential is created at the output of gate 102, which then is present at the left-hand input of gate 109. On the other hand, gate 108 is opened since during the time $t_2$ the positive potential 107 of pulse 105 is present at its right-hand input. The pulse 105 is digitalized with the frequency $f/2$ of the pulses emitted from the frequency splitter 109. The digitalized pulse 105 passes gate 109 because, as mentioned above, a positive potential is present at its left-hand input. Since during the time $t_2$ a positive potential also is present at the left-hand input of gate 110, pulse 105 digitalized with frequency $f/2$ passes gate 110. The following counter 111 once more counts the periods which arrive there during time $t_2$.

Since pulse 105 is digitalized with half frequency, counter 111 registers the time from $t_M$ to the middle of pulse 105.

After the addition of times $t_1$ and $t_2$ the digital display apparatus 112 shows the time $\Delta t_d$ between $t_{ref}$ and the middle of the measurement pulse.

At time $t_M$ (falling edge of measurement pulse 72) a zero potential is present at the left-hand input of gate 110 so that counting is stopped. The time $\Delta t_d$ is again a measurement for the distance of the object 9 from the measurement apparatus.

The circuits described can also be used for exactly measuring the speed components of object 9 vertical to the reference line or for the measurement of the thickness of objects.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for the rapid measurement of the distance of an object from a reference point comprising the steps of:

a. periodically sending a laser beam from a transmitter through a space in which the object is situated by use of a beam deflector;
b. providing a detector means near the transmitter for picking up light from a given direction only;
c. diffusely reflecting the laser beam from the object and registering reflected light on the detector means to create a measurement pulse having start and finish times associated with a respective rise and fall of the measurement pulse;
d. providing a reference reflector means in the path of the transmitted laser beam so as to create a reference pulse when said laser beam is transmitted;
e. receiving the reference pulse with a reference detector to create a reference pulse at a reference time;
f. determining an exact middle of the measurement pulse by circuitry means utilizing the start and finish times of the measurement pulse and including measuring separately the time differences from the reference time to the respective start and finish times; and
g. calculating the distance from an average of the time differences.

2. A method according to claim 1, further including the steps of shaping the measurement pulse in a pulse former, feeding the shaped pulse in parallel to two differentiators for respectively creating first and second pulses representative of rising and falling edges of the shaped pulse and comparing in respective pulse discriminators the reference pulse with the first and second pulses respectively to create first and second timing pulses.

3. A method according to claim 2, including the further steps of converting the first and second timing pulses originating in the pulse discriminators to voltages which are summed, halved and displayed in analog form.

4. A method according to claim 2, including the further steps of digitalizing the first and second timing pulses originating in the pulse discriminators.

5. A method according to claim 4, including the further steps of summing, halving and digitally displaying the digitalized first and second timing pulses.

6. A method according to claim 4, including the further steps of converting the digitalized first and second timing pulses into analog pulses and summing, halving and displaying the analog pulses in analog form.

7. A method for the rapid measurement of the distance of an object from a reference point comprising the steps of:
a. periodically sending a laser beam from a transmitter through a space in which the object is situated by use of a beam deflector;
b. providing a detector means near the transmitter for picking up light from a given direction only;
c. diffusely reflecting the laser beam from the object and registering reflected light on the detector means to create a measurement pulse having start and finish times associated with a respective rise and fall of the measurement pulse;
d. providing a reference reflector means in the path of the transmitted laser beam so as to create a reference pulse when said laser beam is transmitted;
e. receiving the reference pulse with a reference detector to create a reference pulse at a reference time;
f. determining an exact middle of the measurement pulse by circuitry means utilizing the start and finish times of the measurement pulse and measuring the time difference from the reference time to the time corresponding to the exact middle of the measurement pulse;
g. calculating the distance from the time difference;
h. shaping the reference pulse in a pulse former, connecting the shaped reference pulse to a pulse discriminator for producing a control signal from the reference time to the point in time of a falling edge of the measurement pulse, and controlling said measuring step with said control signal of the pulse discriminator; and
i. digitalizing a voltage with a frequency $f$ by use of an oscillator from the reference time until the time represented by a rising edge of the measurement pulse to create counting pulses, digitalizing the measurement pulse with a frequency $f/2$ to create counting pulses, and counting the digitalized voltage and digitalized measurement counting pulses during the period of the control signal.

8. A method for the rapid measurement of the distance of an object in a space from a reference point, comprising the steps of:
a. periodically sending a laser beam from a transmitter by a beam deflector through the space in which the object is situated, said beam diffusely reflecting from the object;
b. registering a measurement pulse of the diffusely reflected beam on a detector placed near the transmitter and which detector can only pick up light from a given direction, said measurement pulse having start and finish times associated with a respective rise and fall of the measurement pulse;
c. creating a reference pulse in a reference detector at a reference time using a swing mirror positioned such that the periodically sent laser beam is reflected on a transparent member situated on the reference line to hit the reference detector; and
d. determining a middle of the measurement pulse by circuitry means utilizing the start and finish times of the measurement pulse and which measures separately the time differences between the reference time and the respective start and finish times and averages the time differences so as to determine the distance of the object from a time difference between a starting point of the reference pulse and the middle of the measurement pulse.

9. An apparatus for the rapid measurement of the distance of an object from a reference point, comprising:
a. a laser beam transmitter;
b. beam deflector means for periodically sending a laser beam through space in which said object is situated;
c. detector means placed near the transmitter for registering a measurement pulse of a beam diffusely reflected from the object, said measurement pulse having start and finish times associated with a respective rise and fall of the measurement pulse;
d. a transparent member means for passing a portion of said laser beam and reflecting a portion of said laser beam;
e. a reference detector means for creating a reference pulse in a reference detector at a reference time when said portion reflected by the transparent member is received;

f. means for determining the distance of the object from a time difference between a start of the reference pulse and a middle of the measurement pulse, said means for determining the distance further including circuitry means for determining said middle of the measurement pulse by utilizing the start and finish times of the measurement pulse to measure separately the time differences between the reference time and the respective start and finish times and averaging the time differences.

10. The apparatus according to claim 9 in which first and second differentiator means are provided to determine the points in time of the rising and falling edge of the measurement pulse, and pulse discriminator means are provided for comparison of the reference time with each of said points in time and for creating output timing pulses in response thereto.

11. The apparatus according to claim 10 in which means for summing, halving and displaying said output timing pulses in analog form are provided.

12. Apparatus according to claim 10 in which means for digitalizing the pulses originating in the pulse discriminator means are provided.

* * * * *